Nov. 26, 1957  M. ALLEN  2,814,148
ARTIFICIAL FLY BODY AND METHOD OF MAKING SAME
Filed Aug. 30, 1956  2 Sheets-Sheet 1

INVENTOR.
MARGARET ALLEN

BY Philip H. Sheridan
ATTORNEY

Nov. 26, 1957 — M. ALLEN — 2,814,148
ARTIFICIAL FLY BODY AND METHOD OF MAKING SAME
Filed Aug. 30, 1956 — 2 Sheets-Sheet 2

INVENTOR.
MARGARET ALLEN
BY Philip H. Sheridan
ATTORNEY

United States Patent Office 2,814,148
Patented Nov. 26, 1957

2,814,148

ARTIFICIAL FLY BODY AND METHOD OF MAKING SAME

Margaret Allen, Boulder, Colo.

Application August 30, 1956, Serial No. 607,232

3 Claims. (Cl. 43—42.25)

This invention relates to artificial fish lures, and more particularly to artificial fishing fly bodies and the method of forming same.

For a great many years fishermen have attempted to simulate insects and other natural fish baits through the use of artificial prototypes thereof designed to resemble the live bait in both appearance and so-called "action" which is such an important factor in attracting game fish to the lure. One of the most successful and widely used forms of artificial lure is the fly which comprises a body formed of silk or nylon thread in a wide variety of colors wrapped upon the shank of a fish hook. Generally, "hackle" feathers from the neck of a chicken or other kind are added to render the fly buoyant and, oftentimes, wings and a tail are used to complete the lure.

In most natural occurring baits the back or upper side of the insect is a different color than the breast or under side and this fact renders the insect extremely difficult to reproduce in the form of an artificial lure as the thread is customarily wound or wrapped in helical fashion around the shank of the hook which renders simulation of the different colored back and breast virtually impossible. As a result, the color variations, if any, have been from end-to-end of the fly rather than from top-to-bottom. These flies, while effective, do not resemble the natural insect nearly as closely as many fishermen would prefer.

An attempt has been made in recent years, however, to simulate the actual insect by wrapping the thread on the hook in such a manner that a different colored back and breast would be produced. The wrapping technique consists of interlacing two threads of different colors by passing one color thread from one side to the other along the breast of the fly, looping it over the thread of the second color which is being passed from one side to the other over the back of the fly, and repeating the process on the first side. This type of fly, while more closely resembling a natural insect, possesses certain inherent limitations that render it somewhat ineffective.

One of the main difficulties is the fact that a fly usually receives rather rough treatment in the hands of a fisherman and it is only necessary to break one strand of thread at one point on a snag or in the mouth of a fish to cause the entire fly body to unravel. This, of course, makes the fly of little value to most fishermen who are in no position or have little inclination to replace unraveled flies at frequent intervals.

A second problem of no less importance than the one mentioned above, is that of the "action" of the fly in the water. "Winged" flies offer less of a problem as the artificial wings tend to maintain the fly in an upright position. However, several of the most desirable and most successful artificial lures do not have wings such as, the nymph, hell-grammite and fresh water shrimp, which are highly effective trout lures.

It is, therefore, one of the principal objects of the present invention to provide an artificial fly body having a different colored back and breast formed from threads which are interlaced in a manner to prevent unraveling even after hard use.

A second object of the invention is to provide an artificial fly body with back and breast of different colors which maintains a natural upright appearance in the water even in the absence of wings.

Another object of the invention is to provide a novel method of tying an artificial fly body.

Further objects of the invention are to provide an artificial fly body which is natural in appearance and adapted for use in forming either winged or non-winged lures.

Other objects will be in part apparent and in part pointed out specifically hereinafter in connection with the description of the drawing which follows and in which.

Figure 1:
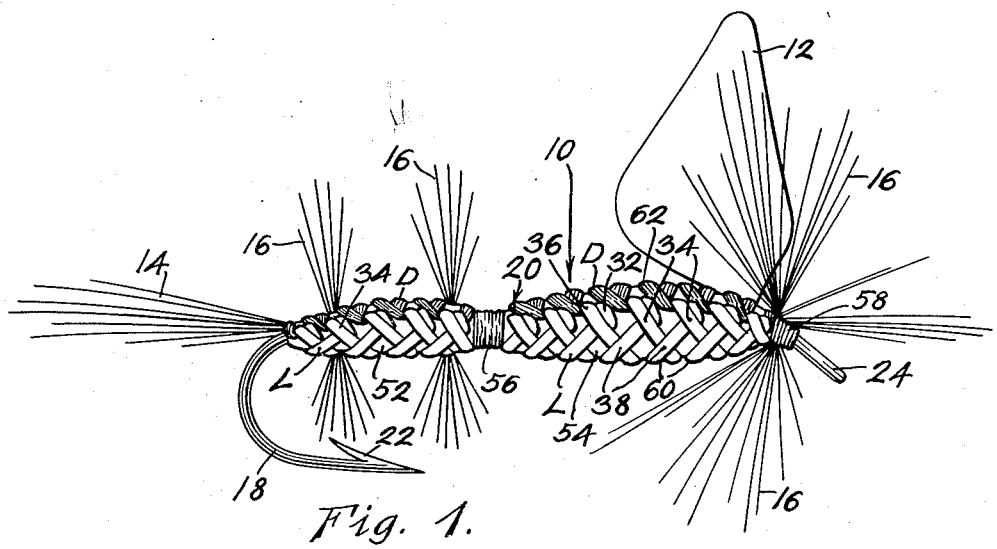
Figure 1 is a side elevation showing an artificial lure provided with the fly body of the present invention.
Figure 6:
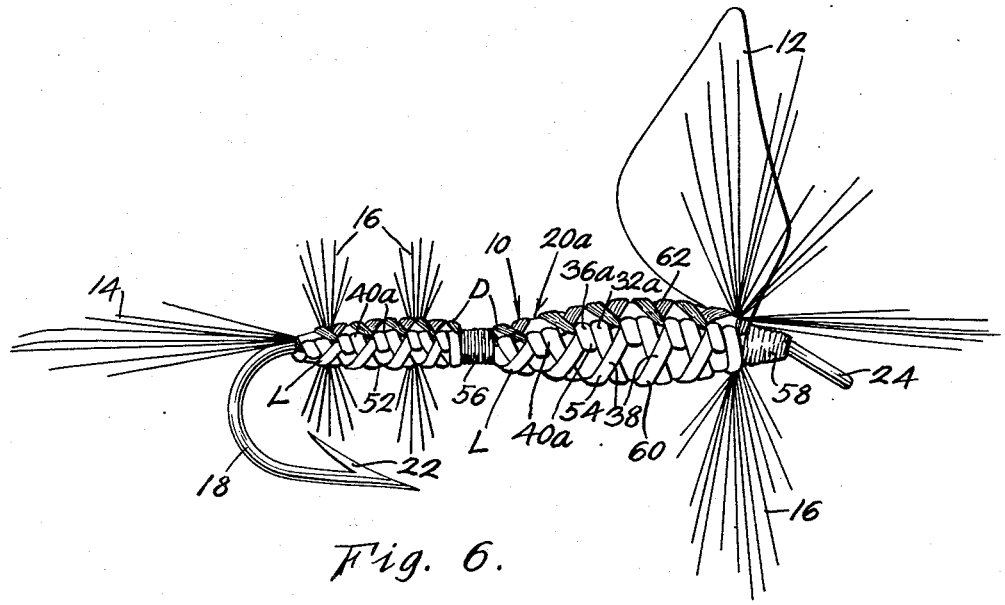
Figure 6 is a side elevation showing a slightly modified form of the fly body of the present invention.

Referring now to the drawing, reference numeral 10 represents, in a general way, the entire fly shown in completed form in Figures 1 and 6. In the particular forms illustrated, the fly includes artificial wings 12, a tail 14, hackle 16, a hook 18 and an artificial fly body indicated in a general way by numerals 20 and 20a. Hook 18 is of a conventional design having a barb 22 at the rear extremity, an eye 24 at the forward extremity and a substantially straight shank 26 therebetween. At this point it should be noted, however, that even though the artificial bodies 20 and 20a that form the subject matter of the instant invention have been illustrated in connection with an artificial lure of the fly type, said body is equally adaptable to simulate the bodies of other insects than those that fly as, for example, nymphs and fresh water shrimp. For the sake of clarity and simplicity the body forms 20 and 20a will be denominated as "fly bodies" as the description proceeds.

Figure 2:
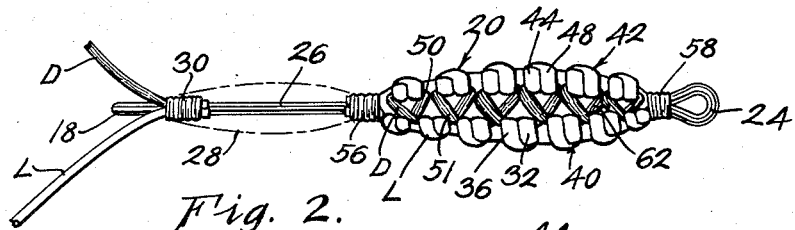
Figure 2 is a top plan view thereof showing the fly before the rear portion, wings and hackle have been added.
Figure 3:
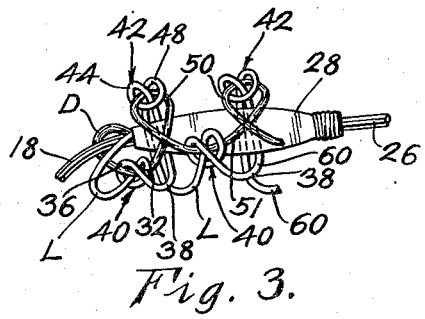
Figure 3 is a diagrammatic view showing the manner in which the two different colored threads that form the back and breast of the fly body are interlaced.
Figure 7:
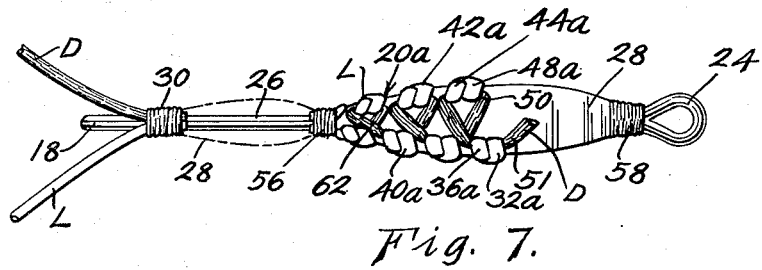
Figure 7 is a top plan view similar to Figure 2, only showing the modification of Figure 6.
Figure 8:
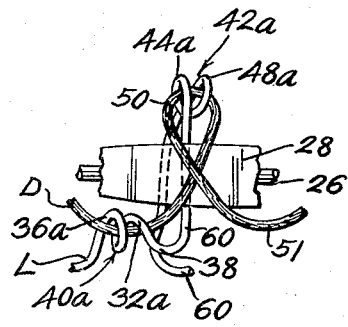
Figure 8 is a view similar to Figure 3 showing the manner of forming the knots or lacings in the modification of Figures 6 and 7.

In the preferred form of the present invention, the shank 26 of the hook is wrapped with thread as shown at 28 in Figures 3 and 8 in order to fatten the body and make it appear more realistic. Before padding the hook shank, however, two threads L and D of contrasting color are attached to the rear of said shank with a seizing 30, shown in Figures 2 and 7. As illustrated, the letter D identifies the darker thread, whereas the letter L identifies the lighter thread. In actual use threads L and D may be any color and are preferably selected to correspond to the colors of the black and breast of the real insect. Both threads L and D extend rearwardly from the shank preparatory to forming the fly body, as clearly shown in Figures 2, 3 and 7. Here it will be well to point out that thread L is used to form the sides and breast of the fly and is the major factor in the fly design, whereas thread D forms a stripe along the back of the finished fly and functions primarily as a connector for the substantially parallel rows of knots in thread L along the back.

Figure 5:
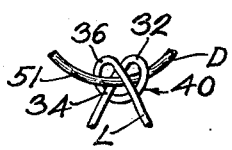
Figure 5 is an enlarged fragmentary view similar to Figure 4 showing the details of the knot or lacing on the near side of the fly body as viewed in Figure 3.

Specifically now in connection with Figures 3 and 5 wherein is illustrated the knots tied on the near side of the fly body as viewed in Figure 1, it will be seen that the free end of thread L is first passed upwardly and forwardly between thread D and the shank, and then downwardly and rearwardly in front of thread D to form forward loop 32 on the near side. To complete the near side knot, the free end of thread L is passed upwardly and rearwardly between both threads L and D and the shank to form the first cross 34, thence downwardly and forwardly to form rear loop 36. Thus, it will become apparent that each of the near side knots, indicated generally by 40, provides a crossover point 34 which acts to prevent the threads from unraveling even though one of the threads is severed.

Figure 4:
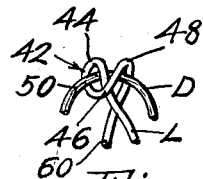
Figure 4 is an enlarged fragmentary view showing the details of the knot or lacing on the far side of the fly body as viewed in Figure 3.

In forming the far side knot, indicated generally by numeral 42 and shown most clearly in Figures 3 and 4, the free end of thread L is passed underneath the shank of the hook, upwardly and rearwardly between the shank and thread D, and then downwardly and forwardly to form the rear loop 44 on the far side. To complete the far side knot, the free end of thread L is passed upwardly and forwardly between the shank and both threads L and D, to form cross 46, thence downwardly from inside to outside over the top of thread D to form forward loop 48 on the far side. From this point thread L again crosses thread D to form a cross 38 underneath the far side as it passes underneath the shank and back to the near side. Thread D is, meanwhile, formed into a series of loops 50 with knot 42 being formed about a segment of the loop and knot 40 on the portion 51 extending between the loops. The sequence is thus repeated forming knots 42 and 40 on the far and near sides of the shank until the completed body is formed. If desired, the fly body may be formed in two sections 52 and 54 (Figures 1 and 6), as shown. The free ends (not shown) of the threads terminate at the forward end of the shank and are seized as at 56 and 58.

The most important and distinctive features of the fly body construction illustrated in Figures 1 through 5 are, however, that the two loops formed in thread L about thread D in each knot cross one another at 34 and 46, and that the portions 60 of the thread L that extend between the knots also cross at 38. Thus the threads, when tightly interlaced as in the finished fly body shown in Figures 1 and 2, are formed into substantially independent segments which terminate in the knots 40 and 42 that prevent the threads from unraveling even though broken. This novel feature is, of course, accomplished by forming the forward loops 32 of each knot 40 before forming the rear loops 36 on the near side, and by forming rear loop 44 of each knot 42 before forming forward loop 48 on the far side.

Referring now in particular to Figures 6, 7 and 8 of the drawing wherein is shown a slightly modified form of the fly body of the present invention, it will be noted that the single basic difference between the modified body 20a and body 20 of Figures 1 through 5 lies in the fact that rear loops 36a and 44a and the forward loops 32a and 48a of the knots 40a and 42a are formed in thread L about thread D without crossing. Thus knots 40a on the near side in Figures 6 and 8 are formed by looping the free end of thread L twice around thread D as in knot 40. However, the two loops 36a and 32a thus formed do not cross as is clearly shown in Figure 8. The same is true of knot 42a on the far side.

Portions 60 that extend between knots 40a and 42a do cross at 38 as in the previously described construction. As in the Figures 1 through 5 modification, therefore, thread L crossing itself at 38 prevents unraveling of the fly body even when one of the threads is broken.

Referring again to all the Figures 1, 2, 6 and 7 of the drawing, it will be noted that thread D forms a narrow stripe 62 along the top of the shank of the hook to simulate the different colored back of most insects. Thread L, on the other hand, is threaded from side to side of the hook shank along the under side thereof and form a series of substantially complete circular arcs between its points of conection with thread D. Thread L provides the artificial fly body with both sides and a breast of the same color in contract to the stripe along its back.

The hackle, wings and tail may be woven into the fly body as threads L and D are laced. The completed fly provides excellent stability in the water and maintains an upright position due to the parallel rows of knots on the sides thereof near the top.

Form the foregoing description of the many useful and novel features of the fly or artificial lure body of the present invention it will be seen that the several objects for which it was designated have been achieved. Although the invention has been illustrated and described in connection with the two specific forms thereof shown in the accompanying drawing, I realize that certain changes may be made therein by those skilled in the art within the intended scope hereof. Therefore, it is my intention that the protection afforded hereby shall be limited only insofar as said limitations are expressly set forth in the appended claims.

What is claimed is:

1. An artificial fish lure body comprising two threads in contrasting colors interlaced on the shank of a fish hook, one of said threads forming a narrow stripe extending along the top of said fish hook to represent the back of an insect and the other of said threads extending transversely from side to side to form substantially a complete circular arc at its points of connection with said one thread thus representing the sides and belly of said insect, the threads being interconnected with one another to form spaced substantially parallel rows of knots extending along the top of the shank of the fish hook, each knot being characterized by two loops of the other thread wrapped about the one thread, the two loops of each knot crossing one another and the portions of the other thread extending between adjacent knots crossing one another to prevent unraveling of the lure body if a thread is broken.

2. The method of forming an artificial lure body which comprises the steps of attaching one end of a first and second contrasting thread to the shank of a fish hook, passing the free end of the first thread twice around the second thread to form a first knot having two loops positioned on the near side of the shank near the top, forming a single loop positioned on the far side of the shank in the second thread, passing the free end of the first thread underneath the shank to the far side thereof and looping said first thread twice through the single loop in the second thread to form a second knot on the far side, passing the free end of the first thread underneath the shank to the near side thereof and looping said first thread twice about the second thread to form a third knot adjacent the first knot, crossing the portions of the first thread extending between any three knots formed in sequence, and thereafter repeating the foregoing steps to form knots alternately on opposite sides of the shank, said knots lying in spaced parallel rows extending in the direction of the length of the shank along the top thereof, the first thread simulating the sides and breast of an insect and the second thread simulating a contrasting stripe along the back thereof.

3. The method of claim 2 including the step of crossing the two loops of each knot.

References Cited in the file of this patent

UNITED STATES PATENTS

| 2,533,523 | Sivey et al. | Dec. 12, 1950 |
| 2,586,719 | Ross | Feb. 19, 1952 |

OTHER REFERENCES

"The Ashley Book of Knots" (Ashley), published by Doubleday and Co., Inc., 1946 (page 216, Figs. 1185 and 1187 and page 291, Fig. 1672 relied on).